(No Model.)
J. WEICHHART.
GOPHER TRAP.
No. 345,345. Patented July 13, 1886.
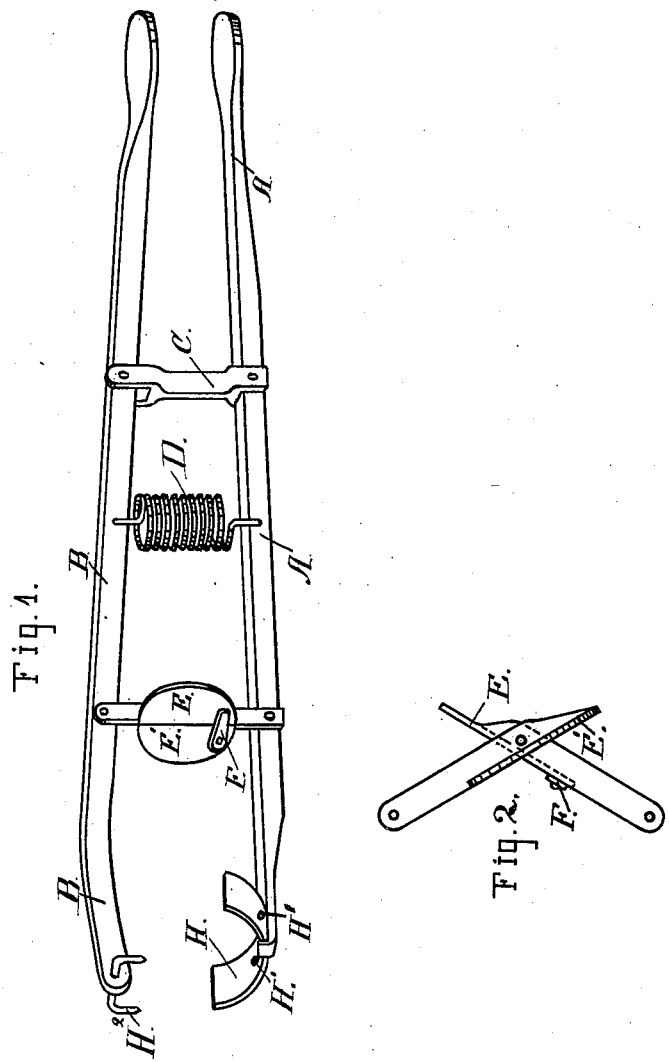
Witnesses:
Wm Mayer
Joseph E. Ford
Inventor:
John Weichhart
C W M Smith
By Atty

UNITED STATES PATENT OFFICE.

JOHN WEICHHART, OF SAN FRANCISCO, CALIFORNIA.

GOPHER-TRAP.

SPECIFICATION forming part of Letters Patent No. 345,345, dated July 13, 1886.

Application filed October 28, 1885. Serial No. 181,197. (No model.)

*To all whom it may concern:*

Be it known that I, JOHN WEICHHART, a citizen of the United States, residing at San Francisco, in the county of San Francisco and State of California, have invented a new and useful Gopher-Trap, of which the following is a specification.

The object of my invention is to provide a means for entrapping and destroying ground-burrowing animals, such as gophers, squirrels, &c.

Referring to the accompanying drawings, forming a part of this specification, Figure 1 is a view in perspective of my trap set for use. Fig. 2 is a side view of the trigger with its parts relaxed.

A represents the stationary arm, and B the movable arm or lever, of my trap, which are connected together by a strap, C. One end of the strap is rigidly connected to the arm A, and the other or opposite end is split and a rivet passes through it and the arm, thus forming a pivoted fulcrum for the lever B. The ends of a stiff spiral spring, D, connect with the arm and lever, and a little below the strap or fulcrum, so that by grasping the upper ends of the arm and lever with the hand and pressing the lever-arm B downward upon its pivotal point, the spring will be expanded, and when the hold or grasp is released the resilience of the spring will force the lower or outer end of the movable lever B quickly down upon the end of the opposite arm, A.

The trigger or pan of my trap consists of two short arms pivoted, the one to the arm A and the other to the lever B, and pivoted likewise to each other, so that when the arm A and lever B move toward each other the short arms will relax or bend toward each other, as shown in Fig. 2. Each one of the short arms is formed with a semicircular plate, E and E', bent out at right angles to the said arms, and so arranged that when the said arms lie in a straight line the plates will together form a circular disk. A stop plate or lug, F, is affixed to the plate E', which serves to limit the movement toward the jaw end of the trap of the plates and arms by keeping said arms in the same straight line, which line is perpendicular to the arm A when the trigger is set in position. By placing the end of the stop nearer or more remote from the face of the plate E the trigger or pan will become more or less sensitive to the touch, as when the central or pivotal point of the two arms of the pan or trigger are made to deviate from a right line with the arm and lever A B. To the end of the arm A is riveted a half circle or curved arm, H, pierced with two holes, H', which latter receive the two barbs or teeth H² connected to the outer end of the operating-lever B.

In operation the end of the lever B away from the jaw of the trap is forced down toward the stationary arm until the pivoted arms come into line with each other, the arms also carrying the pan or trigger with them, when the trap is set for use, in which position the end with the barbs is thrust into the hole of the rodent, and the trap covered with earth. Supposing, always, the rodent to be within his burrow, in the attempt to work his way out or to the surface of the ground, he will force the earth along the hole in front of the body until it strikes the pan or trigger, when the trap will be sprung, and the rodent impaled by the barbs upon the arm of the trap.

Having thus described my invention, what I claim, and desire to secure by Letters Patent, is—

In a gopher-trap, a trigger consisting of short arms pivoted to each other and to the arms A and B of the trap, and carrying semicircular plates E and E', one of which is provided with a stop, F, substantially as shown and described.

In testimony that I claim the foregoing I have hereunto set my hand and seal.

JOHN WEICHHART. [L. S.]

Witnesses:
 C. W. M. SMITH,
 CHAS. E. KELLY.